2,787,611
PROCESS FOR THE PRODUCTION OF SULPHUR DYESTUFFS BY THE DIRECT SULFURIZATION OF 4-HYDROXYDIPHENYLAMINE COMPOUNDS

Hans Bosshard, Basel, Switzerland, assignor to J. R. Geigy A. G., Basel, Switzerland, a Swiss firm No Drawing. Application May 5, 1954,
Serial No. 427,891
Claims priority, application Switzerland May 8, 1953
7 Claims. (Cl. 260—134)

The present invention concerns the production of red-brown to brown, fast-to-chlorine sulphur dyestuffs which are distinguished by their good dyeing properties, their pure shades and the good fastness properties of the cellulose dyeings attained therewith.

It is known that red-brown sulphur dyestuffs are obtained by sulphurising 4-hydroxydiphenyl amines. These dyestuffs are distinguished by the excellent fastness to chlorine of the dyeings on cellulose fibres and are, therefore, very valuable. The sulphurisation is performed over the intermediate step of 2-hydroxydipheno-thiazine. To form this compound such vigorous sulphurisation conditions are necessary that in the further reaction to form the sulphur dyestuff it is very easy for a too far reaching sulphurisation to occur which makes itself apparent by the inferior properties of the end products. Such too strongly sulphurised dyestuffs have a dull, bluish shade, slight drawing power in the sodium sulphide vat on to cellulose fibres, the leuco dyeing oxidises badly in the air and the oxidised dyeing has only slight fastness to alkalies. These difficulties have been overcome in technical processes by performing a two-step reaction. First the 2-hydroxydipheno-thiazine or its oxidation product, dipheno-thiazone-(2) is produced and then this is sulphurised under mild conditions to form the dyestuff. Thus for example, the hydroxydipheno-thiazine is formed in a sulphur melt at temperatures around 180° in the presence of catalysts such as, e. g. iodine and then, after the addition of aqueous sodium sulphide the product is sulphurised in an aliphatic alcohol such as butanol to form the dyestuff. However, only dull dyestuffs are obtained by this method because of lack of purification in the intermediate step. A tried technique consists in condensing o-aminothiophenols with halogen substituted p-benzoquinones to form the dipheno-thiazones which are sulphurised with alkali polysulphide. This method necessitates two separate procedures and proportionally expensive starting materials. In another process, 4-hydroxydiphenylamine is condensed with sulphur chloride under mild conditions in the presence of anhydrous aluminium chloride and large amounts of an inert organic solvent such as, e. g. chlorobenzene, to form hydroxydipheno-thiazine and this, after isolating in alcohol, is converted into the dyestuff with alkali polysulphide. This method also necessitates two separate steps and the preparation of large amounts of solvents.

In contrast to this it has now been found that particularly valuable, fast-to-chlorine red-brown to brown sulphur dyestuffs with good vatting properties with alkali sulphide or hydrosulphite, of good drawing power from the vat on to cellulose fibres, the leuco dyeing of which oxidises well in the air, of pure shade and good fastness to alkalies of the cellulose dyeings, can be obtained directly from 4-hydroxydiphenylamine compounds by sulphurisation. 1 part of a hydroxydiphenylamine compound of the general formula:

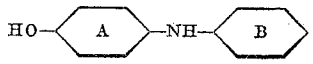

in which the benzene rings A and B can be substituted with halogen and with lower alkyl groups respectively, whilst at least one ortho-position to the imino group should be free in ring B, is melted in a medium containing no iron and in the presence of water soluble organic solvents which boil at over 100° and water, with 1.5 to 3 parts of an alkali polysulphide Me₂Sₓ or with a mixture of an alkali sulphide Me₂S and sufficient sulphur that $x$ corresponds to the value of 5 to 7. After removal of the organic solvent, if necessary, the raw dyestuff or the leuco compound thereof is isolated and oxidised in an alkaline dispersion in the absence of inorganic sulphur compounds.

In the process according to the present invention, 4-hydroxydiphenylamine itself as well as derivatives thereof which are substituted in the phenolic benzene ring by halogen such as chlorine or bromine and/or are substituted in the other benzene ring by low molecular alkyl groups, for example by the methyl, ethyl, propyl or butyl groups, can be used. The preferred alkyl substituent is however, the methyl group. More than one can be present but at least one o-position to the imino nitrogen atom should be free. The benzene ring B can represent, for example the 2.5-, 2.4- or 3.4-dimethylphenyl radical. However, the monomethyl compounds are preferred, and of these, in particular the 4'-methyl-4-hydroxydiphenylamine because it produces sulphur dyestuffs which have particularly favourable properties.

In the process according to the present invention, it is important that the sulphurisation can be performed with the smallest possible amount of alkali polysulphide. This smallest possible amount is dependent on the starting material used and is determined advantageously by a series of trials. In general, 1.5 to at the most 3 parts of a sodium or potassium penta- to hepta-sulphide or the mixture of alkali sulphide with sulphur corresponding thereto, is sufficient. The sulphurising melt should be as free as possible from iron and compounds thereof. As water soluble, organic solvents which boil at over 100°, there can be used for example: pyridine bases such as pyridine, picoline, collidine, and in particular, aliphatic or cyclo-aliphatic alcohols such as butanol, cyclohexanol, ethylene glycol and advantageously, aliphatic ether alcohols such as ethylene glycol monomethyl or monoethyl ether, diethylene glycol as well as diethylene glycol monomethyl ether. The sulphurisation is performed with advantage in an open vessel under reflux at temperatures of over 105° and under 130°. The time taken for the reaction is dependent on the temperature, as at 105° dyestuff formation does indeed occur but to attain the greatest possible yield necessitates a far too long reaction time. At temperatures over 130° the quality of the dyestuff formed is unfavourably influenced. Temperatures of 110° to 125° and reaction times from 20 to 60 hours are advantageous. At temperatures of under 125° a longer or shorter reaction time has no effect on the quality of the dyestuff formed.

In the process according to the present invention, it is of the greatest importance that after sulphurisation, the raw dyestuff be freed as completely as possible from inorganic sulphur compounds and then oxidised. Isolation of the dyestuff is performed advantageously by diluting the sulphurisation melt with water, removing the organic solvent, e. g. by steam distillation, and precipitating the dyestuff either in the form of its leuco compound by salting out or by precipitating the leuco compound with the aid of acids at a pH value of about 7 to 9. The dyestuff can also be isolated in its water insoluble form by oxidation of the vat solution, preferably by air-blowing. The isolated dyestuff freed as completely as possible from adhering inorganic sulphur compounds is then oxidised in an aqueous alkaline solution or suspension, again advantageously by air-blowing. By taking all these measures, it is possible to produce red-brown to brown sulphur dyestuffs of hitherto unattainable purity and with excellent dyeing properties by direct sulphurisation of 4-hydroxydiphenylamine compounds. The cellulose dyeings attained therewith have very good fastness to alkali and washing.

The following examples illustrate the invention without limiting it in any way. Where not otherwise stated, parts are given as parts by weight and the temperatures are in degrees centigrade. The relationship of parts by volume to parts by weight is as that of litres to kilogrammes.

*Example 1*

100 parts of 4-hydroxydiphenylamine are added to a filtered polysulphide solution which has been produced by melting 122 parts of sulphur and 98 parts of 60% techn. sodium sulphide with 220 parts of ethylene glycol monomethyl ether. The sulphurisation melt so obtained is kept for 60 hours under reflux during which time the boiling point is adjusted to 110° by the addition of a little water. After removal of the solvent by steam distillation, the dyestuff is precipitated at 40–60° by air-blowing, filtered off, washed and pasted with 600 parts of water. After adding 20 parts of caustic soda, the suspension is stirred intensively with air blowing for 8 hours at 20–30°, after which the dyestuff is drawn off under suction and dried. It dyes cotton according to the processes described in Examples 5 or 6 in pure bordeaux red shades. The dyeing has good fastness to chlorine and alkali. Instead of ethylene glycol monomethyl ether also ethylene glycol monoethyl ether, ethylene glycol, diethylene glycol monomethyl ether, cyclohexanol, pyridine for example, can be used as solvent.

*Example 2*

100 parts of 4-hydroxy-4'-methyldiphenylamine and a further 48 parts of sulphur are added to a polysulphide solution which has been freed from insoluble residues consisting of 90 parts of sulphur, 107 parts of techn. sodium sulphide (58%), 200 parts of glycol monoethyl ether and 65 parts of water. After boiling for 36 hours under reflux, the melt, with the addition of 15 parts of sodium sulphide (100%) is steam-distilled whereupon the dyestuff is precipitated by air blowing as described in Example 1. The filtered and washed raw dyestuff is then made up to a volume of 1200 parts with water and, after the addition of 25 parts of caustic soda, is well aerated at 15–25° while stirring. The pH value is then adjusted to about 4 by the addition of hydrochloric acid, the dyestuff is drawn off under suction, washed and dried in the vacuum. When dyed according to the processes described in Examples 5 or 6, it produces red-brown cellulose dyeings of great purity and redness of shade which have excellent fastness properties.

Also 240 parts of ethylene glycol can be used as solvent instead of glycol monoethyl ether.

If the sulphurisation melt is performed in 200 parts of pyridine instead of ethylene glycol as solvent, then a dyestuff having almost the same shade and the same properties is obtained.

A dyestuff with similar properties is obtained if in the above example the 4-hydroxy-4'-methyldiphenylamine is replaced by 100 parts of 4-hydroxy-3'-methyldiphenylamine and otherwise the same procedure is followed.

A somewhat more yellowish brown dyestuff is obtained by the use of the same amount of 4-hydroxy-2'-methyldiphenylamine instead of 4-hydroxy-4'-methyldiphenylamine used in the above example.

*Example 3*

100 parts of 4-hydroxy-4'-methyldiphenylamine are added to a polysulphide solution containing no iron sulphide sludge. The polysulphide solution consists of 138 parts of sulphur, 62 parts of sodium sulphide (100%), 200 parts of ethylene glycol monomethyl ether and 50 parts of water. The mixture is heated and the boiling point is kept at 116° by the addition of water. The mixture is boiled for 40 hours under reflux and, after adding 15 parts of sodium sulphide (100%), the melt is diluted with water to a volume of 4000 parts. Diluted hydrochloric acid is then added dropwise at a temperature of 50–60° until the pH value is about 8.5 whereupon the leuco dyestuff which precipitates is filtered off. The filter cake, after being well washed with concentrated salt solution, is pasted with water, the volume of the suspension is brought to 1500 parts, 72 parts of caustic soda are added and the whole is very thoroughly aired for 18 hours. Hydrochloric acid is then added until the pH value is about 4 to 5, the dyestuff is filtered off, washed and dried.

If the same amount of 2-methyl-5-isopropyl-4'-hydroxydiphenylamine is used instead of 4-methyl-4'-hydroxydiphenylamine, a dyestuff which dyes a considerably more yellow colour is obtained.

*Example 4*

A sodium polysulphide solution is produced by melting 95 parts of sulphur with 114 parts of techn. sodium sulphide (56%), 250 parts of ethylene glycol monoethyl ether and 40 parts of water. This solution is clarified by filtration and, after the addition of 100 parts of 4-hydroxy-2'.4'-dimethyldiphenylamine and 61 parts of sulphur, is boiled. The boiling point is kept at 118° by the addition of a little water. After 24 hours, the solvent is removed by methods known per se, 25 parts of sodium sulphide (100%) are added so that 3000 parts by volume of a clear vat are obtained. 300 parts of sodium chloride are added at 60° and sufficient hydrochloric acid is added slowly until all the leuco compound has precipitated. The crude dyestuff which precipitates is filtered off, washed with salt solution and oxidised in an alkaline suspension as described in Example 2. 40 parts of sodium carbonate can also be used instead of caustic soda.

When dyed according to the processes described in Examples 5 or 6, cellulose dyeings are obtained of a strong yellowish red-brown shade. The dyeings are clear in shade and have similar fastness properties to those of the products described in Example 2.

A similar dyestuff is obtained by the method described by sulphurising 100 parts of 4-hydroxy-2'.5'-dimethyldiphenylamine in 240 parts of ethylene glycol.

*Example 5*

3 parts of the dyestuff obtained according to Example 2 are added to 90 parts of water. 9 parts of crystallised sodium sulphide, 6 parts of calcined sodium carbonate and the whole is heated until complete solution is obtained thus forming a dirty yellow coloured "stock" vat. 2900 parts of hot water are added to this solution. 100 parts of cellulose material are treated in the dyebath so prepared for 45 minutes at 50–60°. To improve the drawing power 10 to 60 parts of Glaubers salt or sodium chloride can be added. The dyed goods are wrung out and oxidised by hanging in the air for 15 minutes whereupon a red-brown shade develops. After well rinsing, possibly soaping and then drying, a very pure red-brown dyeing is obtained which is distinguished by good fastness to chlorine and good general fastness properties.

The dyestuffs obtained according to Examples 1, 3 and 4 can be dyed in an analogous manner.

*Example 6*

3 parts of the dyestuff obtained according to Example 2 are added to 10 parts of alcohol or a wetting agent, e. g. turkey red oil and 150 parts of water at 70°. On the addition of 12 parts by volume of caustic soda lye (36° Bé.) and 6 parts of hydrosulphite conc., a clear pale yellow "stock" vat is obtained to which 2800 parts of a dyebath are added containing 6 ml. of caustic soda lye (36° Bé.) and 3 g. of hydrosulphite per litre. Dyeing of the vegetable fibres is performed for 45 minutes at 60°. After wringing out the goods, hanging and rinsing and possibly soaping, a pure red-brown dyeing is obtained of the same shade as that of the sodium sulphide dyeing and with the same excellent fastness properties.

Sodium carbonate can also be used instead of caustic soda lye both for the preparation of the vat and in the dyebath.

Glaubers salt or sodium chloride can also be added to improve the exhaustion of the baths. The dyestuffs obtained according to Examples 1, 3 and 4 can also be used in an analogous manner.

What I claim is:

1. Process for the production of sulphur dyestuffs characterised by melting in a medium containing no iron 1 part of a 4-hydroxydiphenylamine compound of the general formula:

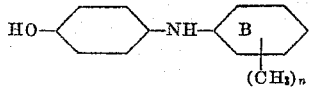

wherein $n$ is an integer from 1 to 2 inclusive, whilst at least one o-position to the imino group should be free in ring B, with 1.5 to 3 parts of an alkali polysulphide $Me_2S_x$ the total sulphur content of which corresponds to 5 to 7 for the index $x$, the melting being performed at 105° to 130° C. in the presence of water soluble organic solvents which boil at over 100° C. and water, isolating the crude dyestuff obtained and aerating it in the absence of inorganic sulphur compounds in an alkaline dispersion.

2. Process for the production of sulphur dyestuffs characterised by melting in a medium containing no iron 1 part of a 4-hydroxydiphenylamine compound of the general formula:

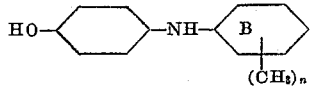

wherein $n$ is an integer from 1 to 2 inclusive, whilst at least one o-position to the imino group should be free in ring B, with 1.5 to 3 parts of an alkali polysulphide $Me_2S_x$ the total sulphur content of which corresponds to 5 to 7 for the index $x$, the melting being performed at 105° to 130° C. in the presence of a water soluble alcohol which boils at over 100° C. and water, isolating the crude dyestuff obtained and aerating it in the absence of inorganic sulphur compounds in an alkaline dispersion.

3. Process for the production of sulphur dyestuffs characterised by melting in a medium containing no iron 1 part of a 4-hydroxydiphenylamine compound of the general formula:

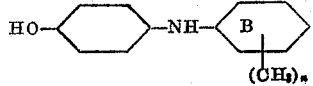

wherein $n$ is an integer from 1 to 2 inclusive, whilst at least one o-position to the imino group should be free in ring B, with 1.5 to 3 parts of an alkali polysulphide $Me_2S_x$ the total sulphur content of which corresponds to 5 to 7 for the index $x$, the melting being performed at 105° to 130° C. in the presence of a water soluble aliphatic ether alcohol which boils at over 100° C. and water, isolating the crude dyestuff obtained and aerating it in the absence of inorganic sulphur compounds in an alkaline medium.

4. Process for the production of a sulphur dyestuff characterised by melting in a medium containing no iron 1 part of 4-hydroxy-4'-methyldiphenylamine with 1.5 to 3 parts of an alkali polysulphide $Me_2S_x$ the total sulphur content of which corresponds to 5 to 7 for the index $x$, the melting being performed at 105° to 130° C. in the presence of ethylene glycol monomethyl ether and water, isolating the crude dyestuff with the aid of acids and oxidising it in the absence of inorganic sulphur compounds by airing in an alkaline dispersion.

5. Process for the production of a sulphur dyestuff characterised by melting in a medium containing no iron 1 part of 4-hydroxy-4'-methyldiphenylamine with 1.5 to 3 parts of an alkali polysulphide $Me_2S_x$ the total sulphur content of which corresponds to 5 to 7 for the index $x$, the melting being performed at 105° to 130° C. in the presence of ethylene glycol monoethyl ether and water, isolating the crude dyestuff by air-blowing and oxidising it in the absence of inorganic sulphur compounds by airing in an alkaline dispersion.

6. Process for the production of a sulphur dyestuff characterised by melting in a medium containing no iron 1 part of 4-hydroxy-2'.4'-dimethyldiphenylamine with 1.5 to 3 parts of an alkali polysulphide $Me_2S_x$ the total sulphur content of which corresponds to 5 to 7 for the index $x$, the melting being performed at 105° to 130° C. in the presence of ethylene glycol monoethyl ether, and water, isolating the crude dyestuff with the aid of acids and oxidising it in the absence of inorganic sulphur compounds by airing in an alkaline dispersion.

7. Process for the production of a sulphur dyestuff characterised by melting in a medium containing no iron 1 part of 4-hydroxy-2'.5'-dimethyldiphenylamine with 1.5 to 3 parts of an alkali polysulphide $Me_2S_x$ the total sulphur content of which corresponds to 5 to 7 for the index $x$, the melting being performed at 105° to 130° C. in the presence of ethylene glycol and water, isolating the crude dyestuff with the aid of acids and oxidising it in the absence of inorganic sulphur compounds by airing in an alkaline dispersion.

References Cited in the file of this patent

UNITED STATES PATENTS

| | | |
|---|---|---|
| 2,156,071 | Strouse | Apr. 25, 1939 |
| 2,165,493 | Lubs et al. | July 11, 1939 |
| 2,657,112 | Robinson et al. | Oct. 27, 1953 |